United States Patent
Esteghlal

(10) Patent No.: US 11,329,565 B2
(45) Date of Patent: May 10, 2022

(54) FEED-FORWARD CONTROL FOR REGULATING A DC-DC VOLTAGE CONVERTER

(71) Applicant: Robert Bosch GmbH, Stuttgart (DE)

(72) Inventor: Gholamabas Esteghlal, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 740 days.

(21) Appl. No.: 16/087,353

(22) PCT Filed: Feb. 27, 2017

(86) PCT No.: PCT/EP2017/054487
§ 371 (c)(1),
(2) Date: Sep. 21, 2018

(87) PCT Pub. No.: WO2017/162408
PCT Pub. Date: Sep. 28, 2017

(65) Prior Publication Data
US 2021/0211057 A1    Jul. 8, 2021

(30) Foreign Application Priority Data
Mar. 24, 2016 (DE) ...................... 10 2016 205 037.0

(51) Int. Cl.
H02M 3/335    (2006.01)
H02M 1/42    (2007.01)
H02M 1/00    (2006.01)

(52) U.S. Cl.
CPC ....... *H02M 3/33507* (2013.01); *H02M 1/425* (2013.01); *H02M 1/0012* (2021.05); *H02M 1/0022* (2021.05); *H02M 1/0025* (2021.05)

(58) Field of Classification Search
CPC ......... H02M 3/156–1588; H02M 1/44; H02M 1/0022; H02M 1/0025; H02M 2001/0016;
(Continued)

(56) References Cited

U.S. PATENT DOCUMENTS

| 6,984,966 B2* | 1/2006 | Kubota ................. H02M 3/156 323/282 |
| 9,450,492 B1* | 9/2016 | Bizjak ................... H02M 3/158 |

(Continued)

FOREIGN PATENT DOCUMENTS

| CN | 103683860 A | 3/2014 |
| CN | 103812342 A | 5/2014 |

(Continued)

OTHER PUBLICATIONS

International Search Report for Application No. PCT/EP2017/054487 dated May 22, 2017 (English Translation, 2 pages).

(Continued)

*Primary Examiner* — Thienvu V Tran
*Assistant Examiner* — Nusrat Quddus
(74) *Attorney, Agent, or Firm* — Michael Best & Friedrich LLP

(57) ABSTRACT

The present invention provides regulation for an output voltage of a DC-DC voltage converter. The controlled variable provided to the regulator of the DC-DC voltage converter is in this case made up of a controlled variable from a voltage regulator and a further controlled variable from an initial controller. The controlled variable from the voltage regulator is in this case obtained directly from the comparison of the output voltage with a setpoint voltage. The controlled variable from the initial controller takes into consideration, inter alia, the input voltage of the DC-DC voltage converter, the value of the input DC voltage being able to be corrected such that the voltage regulator can be operated close to the zero point during steady-state operation. In this manner, faster and more precise regulation of the output voltage is obtained.

9 Claims, 3 Drawing Sheets

(58) Field of Classification Search
CPC .. H02M 2001/0025; H02M 3/22; H02M 1/08; H02M 1/36; H02M 3/24; H02M 3/325; H02M 3/28; H02M 3/33569; H02M 2007/4815; H02M 2007/4818; H02M 1/083; H02M 3/33538; H02M 3/33515; H02M 3/33576; H02M 3/33592; H02M 3/33523; H02M 3/335; H02M 3/33546; H02M 3/33553; H02M 3/33507; Y02B 70/1491

See application file for complete search history.

(56) References Cited

U.S. PATENT DOCUMENTS

| | | | |
|---|---|---|---|
| 10,530,251 B1* | 1/2020 | Hoffmeister | H02M 1/4225 |
| 2002/0131279 A1 | 9/2002 | Tang | |
| 2005/0213352 A1* | 9/2005 | Lys | H02M 3/157 |
| | | | 363/17 |
| 2008/0082277 A1* | 4/2008 | Holmquist | G05B 11/28 |
| | | | 702/64 |
| 2008/0169796 A1* | 7/2008 | Buethker | H02M 3/1582 |
| | | | 323/282 |
| 2008/0239766 A1* | 10/2008 | Trattler | H02M 3/33523 |
| | | | 363/21.05 |
| 2010/0114399 A1* | 5/2010 | Higuchi | H02M 3/157 |
| | | | 700/298 |
| 2010/0231183 A1 | 9/2010 | Jan et al. | |
| 2012/0087159 A1* | 4/2012 | Chapman | H02J 3/383 |
| | | | 363/41 |
| 2013/0051084 A1 | 2/2013 | Hachiya et al. | |
| 2013/0163287 A1* | 6/2013 | Pal | H02M 3/33515 |
| | | | 363/16 |
| 2014/0125306 A1* | 5/2014 | Babazadeh | H02M 3/156 |
| | | | 323/285 |
| 2014/0217817 A1 | 8/2014 | Raichle et al. | |
| 2014/0292293 A1 | 10/2014 | Feckl et al. | |
| 2015/0055375 A1* | 2/2015 | Karlsson | H02M 3/33592 |
| | | | 363/17 |
| 2015/0092462 A1 | 4/2015 | Ohori et al. | |
| 2015/0137785 A1* | 5/2015 | Stevens | H02M 3/157 |
| | | | 323/283 |
| 2015/0326120 A1* | 11/2015 | Kelin | H02M 3/158 |
| | | | 323/282 |
| 2017/0248996 A1* | 8/2017 | Zhang | H02M 3/1584 |
| 2019/0006940 A1* | 1/2019 | Jans | H02M 3/3385 |
| 2019/0058393 A1* | 2/2019 | Elferich | H05B 45/3725 |
| 2019/0081565 A1* | 3/2019 | Jans | H03K 5/2472 |

FOREIGN PATENT DOCUMENTS

| | | |
|---|---|---|
| CN | 104821726 A | 8/2015 |
| DE | 102011083010 | 3/2013 |
| DE | 102013107792 A1 | 1/2015 |
| EP | 1847007 A2 | 10/2007 |
| JP | 2014107891 A | 6/2014 |

OTHER PUBLICATIONS

Anonymous: "Convertisseur Flyback—Wikipedia", Nov. 15, 2014, XP055370629.

Joachim Deutscher: "Regelung mit mehreren Freiheitsgraden", Jan. 10, 2012, pp. 1-1, XP055370778.

* cited by examiner

FEED-FORWARD CONTROL FOR REGULATING A DC-DC VOLTAGE CONVERTER

BACKGROUND OF THE INVENTION

The present invention relates to a DC-DC voltage converter and a method for regulating a DC-DC voltage converter. In particular, the present invention relates to a DC-DC voltage converter for converting an input DC voltage into a predetermined output DC voltage.

In electric or hybrid vehicles, the supply of a low-voltage vehicle electrical system may be ensured by a high-voltage network of the vehicle. The high-voltage network of the vehicle is used in particular for supplying the electric drive. In order to feed electric power into the low-voltage vehicle electrical system of an electric or hybrid vehicle via the high-voltage network, for example, a DC-DC converter may be used. Such DC-DC converters can draw electric power from the high-voltage network and convert the voltage of the high-voltage network into a corresponding vehicle electrical system voltage.

The publication DE 10 2011 083 010 A1 discloses a control device for a DC-DC converter, and a method for operating a DC-DC converter for the power supply of a vehicle electrical system of a hybrid vehicle from a high-voltage network. For this purpose, a voltage regulating means is provided which regulates the output voltage of the DC-DC converter as a controlled variable. Furthermore, a current regulating means is provided which regulates the output current of the DC-DC converter as a controlled variable.

SUMMARY OF THE INVENTION

The present invention discloses a DC-DC voltage converter for converting an input DC voltage into a predetermined output DC voltage, and a method for regulating a DC-DC voltage converter.

A DC-DC voltage converter is provided for converting an input DC voltage into a predetermined output DC voltage, comprising a comparison means, a correction means, a regulating means, a calculating means, and a DC-DC converter. The comparison means is designed to provide a controlled variable, based on a comparison of the value of the output DC voltage of the DC-DC voltage converter with a predetermined setpoint voltage value for the output DC voltage. The correction means is designed to adjust a value of the input DC voltage of the DC-DC voltage converter, based on a previously determined correction function, and to output the value of the adjusted input DC voltage. The regulating means is designed to calculate an additional controlled variable, using the adjusted input DC voltage and the predetermined setpoint voltage value for the output DC voltage. The calculating means is designed to calculate a regulator value from the controlled variable of the comparison means and the additional controlled variable of the regulating means. The DC-DC converter is designed to convert the input DC voltage into the output DC voltage, using the regulator value calculated by the calculating means.

A method for regulating a DC-DC voltage converter is also provided, the method comprising the steps of ascertaining a controlled variable, based on a comparison of the value of an output DC voltage of the DC-DC voltage converter with a predetermined setpoint voltage value for the output DC voltage; adjusting a value of an input DC voltage of the DC-DC voltage converter, based on a previously determined correction function; calculating an additional controlled variable, using the value of the adjusted input DC voltage and the predetermined setpoint voltage value for the output DC voltage; combining the ascertained controlled variable and the calculated additional controlled variable into a regulator value; and controlling the output voltage of a DC-DC converter, based on the regulator value.

The present invention is based on the knowledge that regulation, for example, regulating the voltage of a DC-DC converter, can be carried out particularly rapidly and efficiently if the corresponding regulator only has to correct a minor regulator deviation.

It is therefore one idea of the present invention to take this knowledge into account and to provide a feed-forward control system for the voltage regulation of the output voltage of a DC-DC converter, which is adaptively adjustable to the input voltage of the DC-DC converter. By adaptively adjusting the controlled variable of the feed-forward control to the input voltage, it is thus only necessary for the actual voltage regulator to correct the remaining minor voltage fluctuations at the output of the DC-DC converter.

The adaptive adjustment of the feed-forward control thus results in a relatively minor regulator deviation in the case of a change in the operating point. As a result, the dynamic behavior of the voltage regulation of the DC-DC voltage converter may be improved.

According to one embodiment, the correction means is designed to calculate the correction function for the adjustment of the value of the input DC voltage, using the controlled variable ascertained by the comparison means and the value of the input DC voltage. In particular in the case of steady-state operation, if it is detected, by means of the controlled variable, that the controlled variable of the comparison means must intervene into the regulator in steady-state operation in order to achieve the desired output voltage at the output of the DC-DC converter, this is an indication that the feed-forward control, in particular the taking into account of the instantaneous input voltage of the DC-DC voltage converter, is not optimally set. By adapting the correction function for adjusting the value of the input DC voltage, a feed-forward control may be subsequently adjusted in such a way that in steady-state operation, preferably no intervention, or only a very minor intervention, is required via the controlled variable of the comparison means.

According to one embodiment, the correction means is designed to adjust the correction function if a predetermined enabling condition has been met. Such an enabling condition may, for example, comprise parameters, for example, the operating mode of the DC-DC converter, a value range for the input current into the DC-DC converter, an evaluation of an intermediate-circuit voltage in the DC-DC converter, an evaluation of the output DC voltage of the DC-DC converter, and/or a comparison of the controlled variable of the comparison means with a predetermined threshold value. The aforementioned parameters may be interlinked and possibly linked to other parameters, in order to initiate an enabling condition for adjusting the correction function.

According to one embodiment, the DC-DC converter comprises a transformer. In this case, the regulating means may be designed to calculate the correction value using the transformation ratio of the transformer. By taking into account the transformation ratio of the transformer in the DC-DC converter, the voltage ratios on the output side may be inferred from the voltage ratios on the input side of the DC-DC voltage converter.

According to one embodiment of the method for regulating a DC-DC voltage converter, the correction function is calculated using the ascertained controlled variable and the value of the input DC voltage.

According to another embodiment, the correction function is calculated if a predetermined enabling condition has been met. The enabling condition may take into account parameters such as the operating mode of the DC-DC converter, a value range of the input current into the DC-DC converter, an evaluation of the intermediate-circuit voltage in the DC-DC converter, an evaluation of the output voltage of the DC-DC converter, and/or a comparison of the controlled variable with a predetermined threshold value.

According to another embodiment, the regulator value is calculated using a value of the input current into the DC-DC converter. By taking into account the input current into the DC-DC converter, it is also possible in particular to take into account parasitic effects, for example, voltage drops across conductors or components, etc.

The above embodiments and refinements may be combined in any manner, to the extent that this is reasonable. Additional embodiments, refinements, and implementations of the present invention also comprise combinations of features of the present invention not explicitly mentioned, which have been previously described or which are described below with respect to the exemplary embodiments. In particular, those skilled in the art will also add individual aspects to the respective basic forms of the present invention as improvements or refinements.

BRIEF DESCRIPTION OF THE DRAWINGS

The present invention will be described in greater detail below, based on the exemplary embodiments specified in the schematic figures of the drawings. The following are shown.

DETAILED DESCRIPTION

Figure 1:
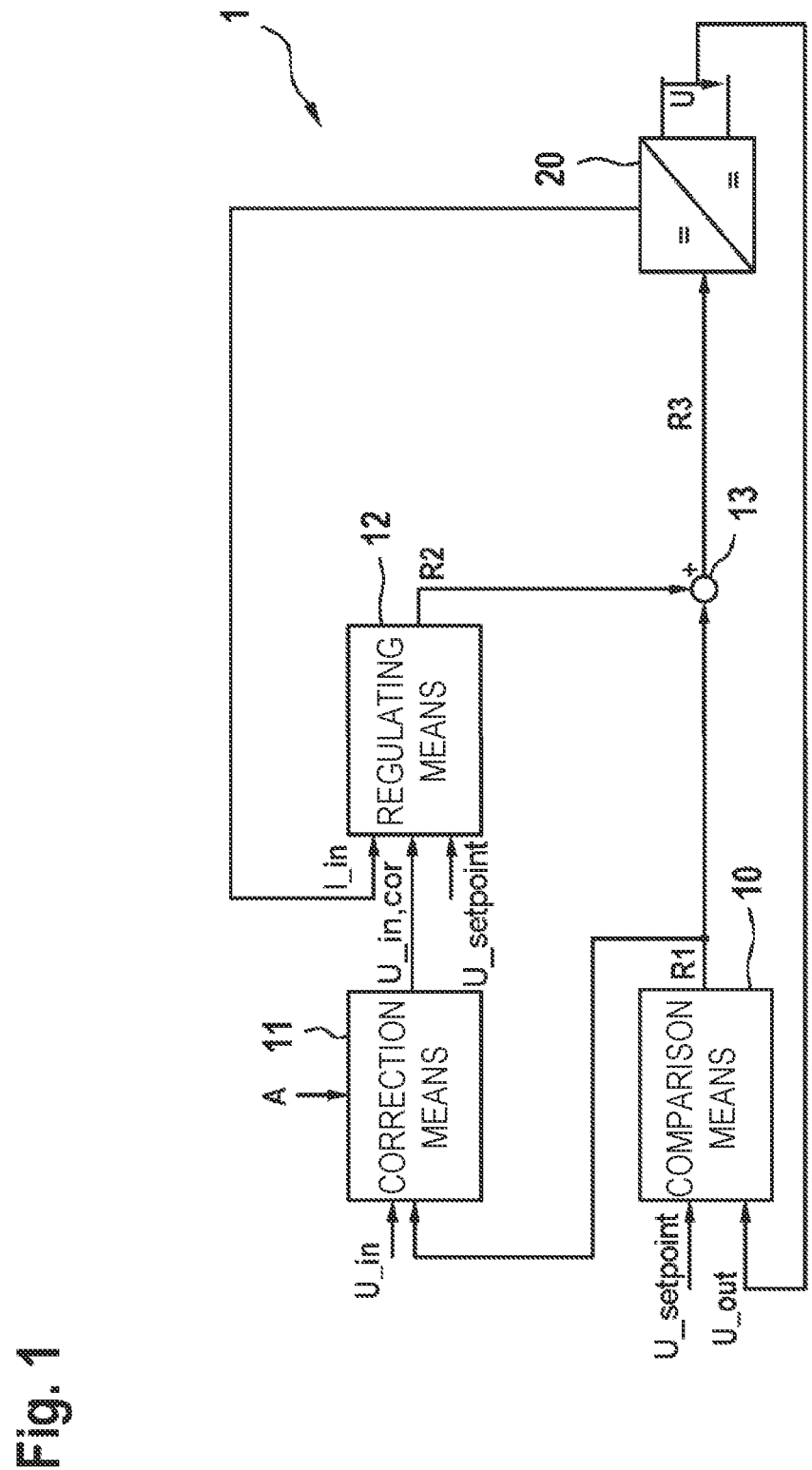
FIG. 1 shows a schematic representation of a DC-DC voltage converter according to one exemplary embodiment.

In all figures, identical or functionally identical elements and devices have been provided with identical reference characters, unless specified otherwise.

FIG. 1 shows a schematic representation of a block diagram of a DC-DC voltage converter 1 according to one embodiment. The conversion of the input DC voltage into the output DC voltage takes place in the DC-DC converter 20. Voltage regulation is carried out in order to achieve a constant output DC voltage having a predetermined voltage level for the output voltage of the DC-DC voltage converter 1. The voltage regulation comprises a feed-forward control based on the value of the input DC voltage U_in, by means of the correction means 11 and the regulating means 12, and a voltage regulation by means of the comparison means 10. The controlled variables of the comparison means 10 and the feed-forward control are combined in the calculating means 13 and supplied as a regulator value R3 to the DC-DC converter 20.

The DC-DC converter 20 receives the regulator value R3, which results from the combination of the controlled variable R1 of the comparison means 10 with the additional, second controlled variable R2 of the feed-forward control. Based on the received regulator value R3, an adjustment of the operating point takes place in the DC-DC converter 20. For example, a sampling ratio may be adjusted for activating switching elements in the DC-DC converter 20, as a function of the received regulator value R3. In addition, any suitable additional measures for adjusting an operating point are possible in order to adjust the output voltage U_out of the DC-DC converter 20 as a function of the received regulator value R3.

The DC-DC converter 20 may be any DC-DC converter of which the output voltage is adjustable as a function of a regulator value R3. In particular, the DC-DC converter 20 may, for example, be a step-down converter which converts an input DC voltage U_in into a lower output DC voltage U_out. However, step-up converters or combined step-up/step-down converters are also possible. In particular, the DC-DC converter 20 may, for example, comprise a combination made up of an inverter, a transformer, and a downstream rectifier. In this case, the activation of the switching elements of the inverter of such a DC-DC converter, and/or an activation of switching elements of an active rectifier in a DC-DC converter, may be adjusted as a function of a received regulator value. In addition, any other switching configurations for a DC-DC converter are also possible.

Thus, the DC-DC converter 20 is to output a preferably constant output DC voltage U_out, preferably even in the case of a fluctuating input voltage U_in. The predetermined setpoint voltage value U_setpoint may be fixedly predetermined for the output DC voltage U_out. However, it is alternatively also possible that the setpoint voltage value U_setpoint is adjustable for the output DC voltage U_out.

The value of the output DC voltage U_out of the comparison means 10 is provided for regulating the output voltage U_out, and in the comparison means 10, the value of the output DC voltage U_out is compared with the predetermined setpoint voltage value U_setpoint. The comparison means 10 determines a first controlled variable R1 as a function of the comparison between the value of the output DC voltage U_out and the setpoint voltage value U_setpoint, and provides it at the output of the comparison means 10.

In addition, the regulating means 12 generates a second controlled variable R2. For generating the second controlled variable R2, the regulating means 12 compares the predetermined setpoint voltage value U_setpoint for the output DC voltage with a value which corresponds to the input DC voltage U_in. In this way, the regulating means 12 can generate a second controlled variable R2 which takes into account fluctuations in the input DC voltage U_in. The first controlled variable R1 of the comparison means 10 and the second controlled variable R2 of the regulating means 12 are subsequently combined in the calculating means 13. For example, analog or digital signals of the first and second controlled variables R1 and R2 may be added or superimposed. From the combination of the first controlled variable R1 and the second controlled variable R2, the calculating means 13 thus generates a regulator value R3 which is used for controlling the operation of the DC-DC converter 20 and in particular for adjusting the output DC voltage U_out of the DC-DC converter 20.

Depending on the system, errors may possibly occur when detecting the input DC voltage U_in. For example, a voltage detector used for detecting the value of the input DC voltage U_in may be incorrectly calibrated, or may provide inaccurate measured values due to temperature effects or aging. Other influences which result in incorrect or inaccurate values of the input DC voltage U_in are of course also possible. In this case, the regulating means 12 would provide a controlled variable as a second controlled variable R2, which would cause the DC-DC converter 20 to output an output DC voltage U_out, the value of which deviates from the predetermined setpoint voltage value U_setpoint. In order to compensate for this deviation, the comparison means 10 would have to continuously generate a first controlled variable R1 which counteracts this deviation. In this case, the combination of the first controlled variable R1 and the second controlled variable R2 in the calculating means 13 also results in the DC-DC converter 20 providing an output DC voltage U_out at the predetermined voltage level.

However, in order to prevent the comparison means 10 from also having to intervene into regulation events in steady-state operation, in particular at a constant input DC voltage U_in, an adjustment of the value of the input DC voltage U_in takes place in the correction means 11. For this purpose, the correction means 11 receives a value of the input DC voltage U_in of the DC-DC voltage converter 1. For example, this value of the input DC voltage U_in may have been detected by a voltage sensor or the like. Based on the previously determined correction function, the value of the input DC voltage U_in is adjusted in the correction means 11, and this adjusted value U_in,cor is subsequently provided as an input parameter to the regulating means 12. Any suitable functions are possible for the correction function for adjusting the value of the input DC voltage U_in. In a simplest case, for example, a constant offset may be added to or subtracted from the value of the input DC voltage U_in. In addition or alternatively, multiplication by a suitable correction factor is also possible. In addition, the ascertainment of more complex correction functions is possible for adjusting the value of the input DC voltage U_in. An example of the ascertainment of a correction function for adjusting the value of the input DC voltage U_in will be described in greater detail below.

From the adjusted value U_in,cor of the input DC voltage, and the predetermined setpoint voltage value U_setpoint, the correction means 11 thus ascertains the second controlled variable R2, which is included as a component in the calculation of the regulator value R3 for controlling the DC-DC converter 20. The objective is to achieve an output DC voltage U_out in steady-state operation, i.e., at a constant input DC voltage U_in and static operating conditions, which preferably requires no intervention by the comparison means 10 by means of the first controlled variable R1. For this purpose, in addition to the corrected value U_in,cor of the input DC voltage, a value of the electric current I_in which flows into the DC-DC converter 20 may optionally also still be included during the determination of the second controlled variable R2 by the regulating means 12. By taking into account the input current I_in, for example, fluctuating voltage drops across conductors or components may also be taken into account.

For adjusting or determining the correction function in the correction means 11, for example, the first controlled variable R1, which was generated by the comparison means 10, may be used. If a first controlled variable R1, which arises from a difference between intermediate value of the output DC voltage U_out and the setpoint voltage value U_setpoint, is generated in steady-state operation by the comparison means 10, the second controlled variable R2 of the regulating means 12 is not optimally set. This may, inter alia, be due to from an incorrect adjustment of the value U_in,cor of the input DC voltage in the correction means 11. If such a first controlled variable R1 is detected in steady-state operation by the correction means 11, the correction function may be correspondingly adjusted in the correction means 11. In particular, the correction of the value of the input DC voltage U_in may be adjusted in such a way that the first controlled variable R1 of the comparison means 10 goes to zero in steady-state operation. For this purpose, the correction means 10 may, for example, adjust an offset and/or a correction factor using the first controlled variable R1. After completing the adjustment of the correction function in the correction means 11, the regulation of the output voltage of the DC-DC converter 20 takes place preferably exclusively via the second controlled variable R2. In steady-state operation, the first controlled variable R1 of the comparison means 10 should preferably be near the zero point.

However, the adjustment of the correction function in the correction means 11 does not take place continuously, but rather, only under previously determined general conditions. For this purpose, for example, the adjustment of the correction function in the correction means 11 can take place only if the predetermined enabling condition has been met. For example, an activation signal A may be provided to the correction means 11. An evaluation of the first controlled variable R1 for adjusting the correction function takes place only if this activation signal A is active (for example, logical 1).

Figure 2:
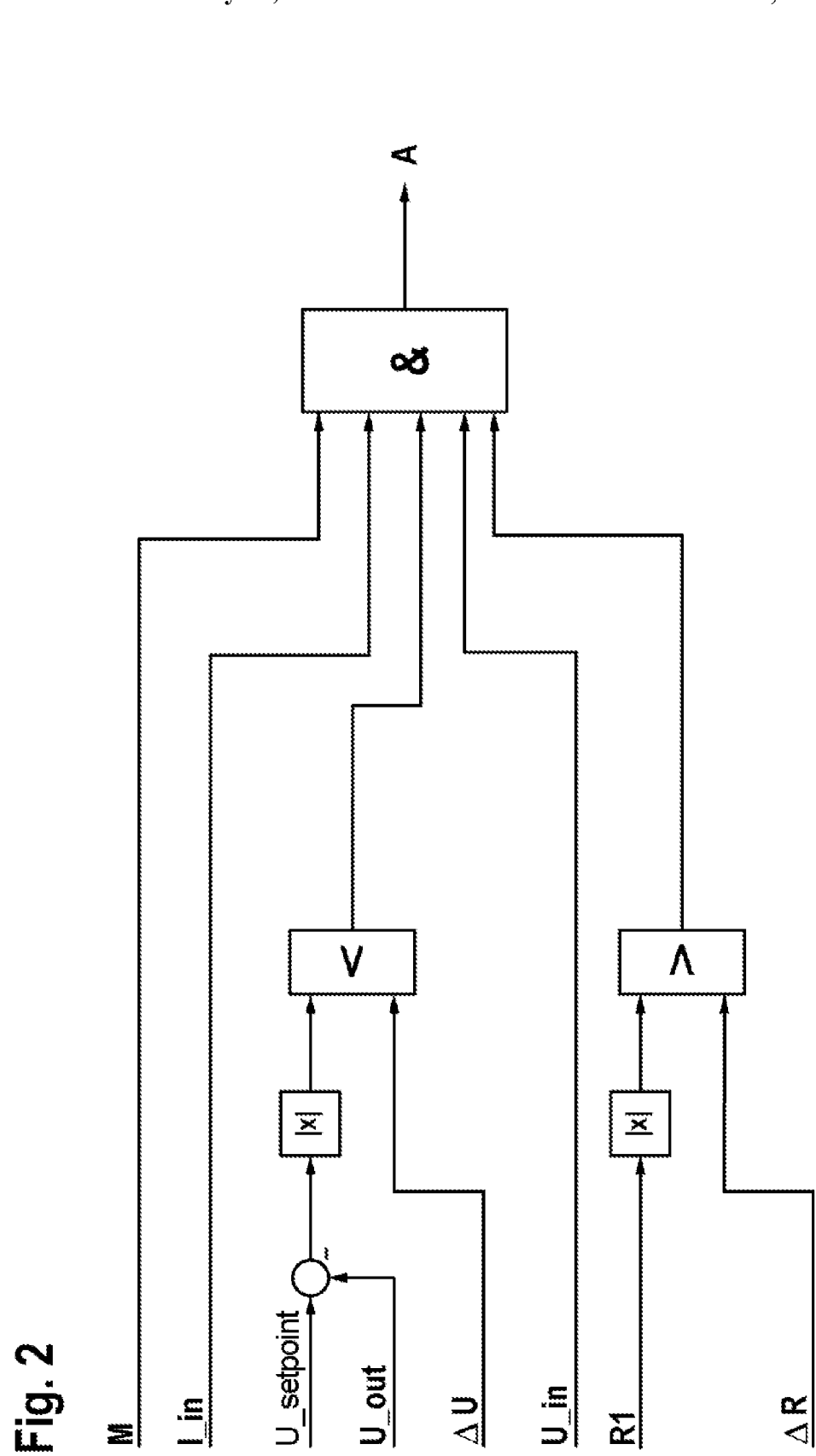
FIG. 2 shows a schematic representation of a diagram for ascertaining an enabling condition, based on a DC-DC voltage converter according to one exemplary embodiment.

FIG. 2 shows a schematic representation of the generation of an enabling condition for adjusting the correction function, according to one embodiment. For example, an operating mode M of the DC-DC converter 20 may be evaluated for determining the enabling condition. In particular, the activation may be limited only to a predetermined operating mode M, for example, step-down converter operation, step-up converter operation, etc.

Furthermore, the direct current I_in flowing into the voltage converter 1 may also be evaluated. For example, the enabling for adjusting the correction function may be limited to a previously determined value range for the input current I_in. Thus, for example, it may be ensured that the DC-DC converter 20 is not in intermittent operation, and thus no linear general conditions would exist.

Furthermore, for example, for determining the enabling condition A, it may be checked whether the system is in a steady state. If, for example, the output DC voltage U_out deviates from the predetermined setpoint voltage value U_setpoint by more than a predetermined threshold value ΔU, the system is not yet corrected. In this case, no enabling should take place for adjusting the correction function.

Furthermore, it may also be checked whether the input voltage U_in, which, for example, is present at an intermediate circuit of the DC-DC converter 20, is stable.

Furthermore, it is also conceivable to carry out the adjustment of the correction function only if the intervention of the first controlled variable R1 of the comparison means 10 exceeds a predetermined threshold value ΔR.

Of course, the calculation of the enabling condition is not limited to the previously determined conditions. It is possible to combine all previously determined general conditions, or also to evaluate only a portion of the previously described general conditions for an enabling condition A. In addition, additional general conditions may also be included as parameters for determining the enabling condition A.

Figure 3:
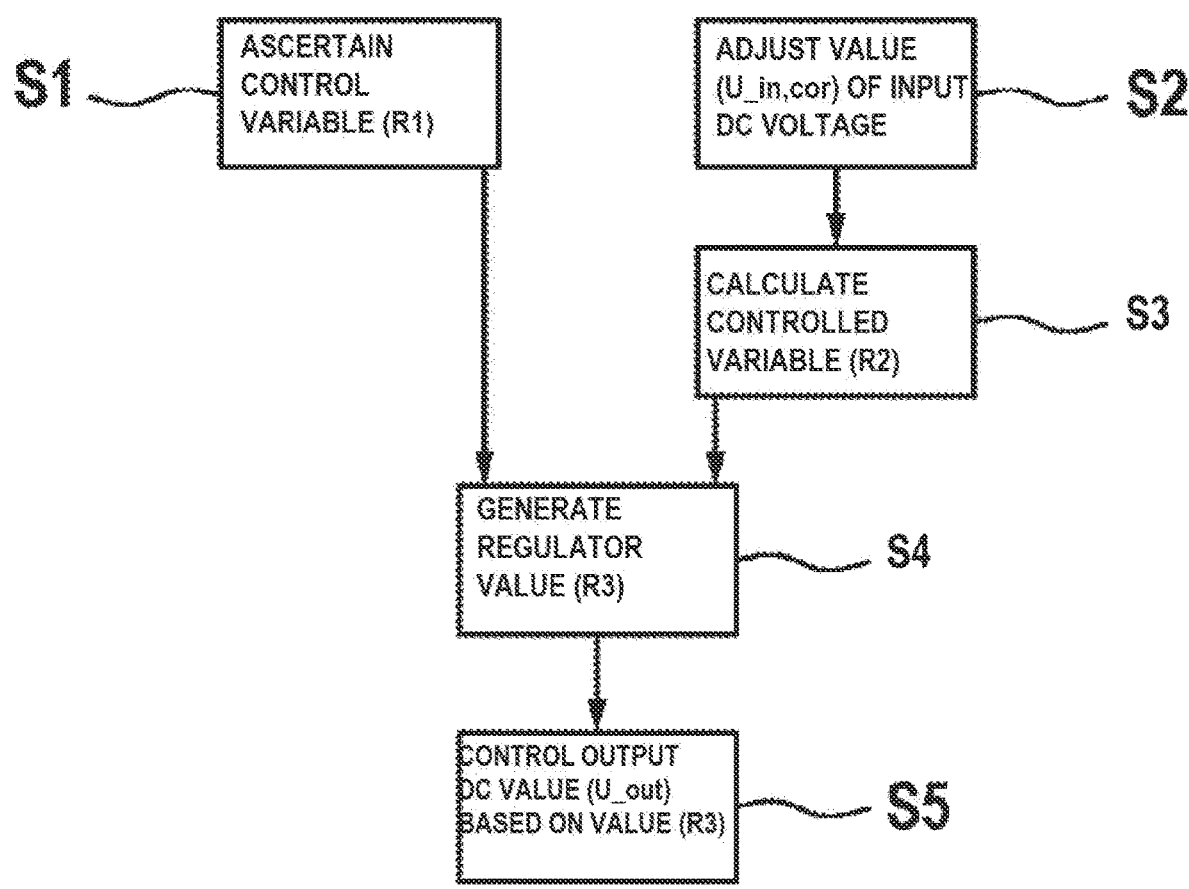
FIG. 3 shows a flow chart for a method for regulating a DC-DC voltage converter, based on one exemplary embodiment.

FIG. 3 shows a schematic representation of a flow chart for a method for regulating a DC-DC voltage converter. In step S1, a controlled variable R1 is ascertained based on a comparison of the value of an output DC voltage U_out of the DC-DC converter 20 with a predetermined setpoint voltage value U_setpoint for the output DC voltage U_out. In step S2, an adjustment of the value of the input DC voltage U_in of the DC-DC converter 20 takes place, based on a previously determined correction function. In step S3, an additional controlled variable R2 is calculated using the value U_in,cor of the adjusted input DC voltage and the predetermined setpoint voltage value U_setpoint for the output DC voltage U_out. In step S4, the ascertained controlled variable R1 and the calculated additional controlled variable R2 are combined into a regulator value R3. Finally, in step S5, the activation of the DC-DC converter 20 takes place, based on the regulator value R3.

In summary, the present invention relates to the regulation of the output voltage of a DC-DC voltage converter. The controlled variable provided to the regulator of the DC-DC voltage converter is made up of a controlled variable of a voltage regulator and an additional controlled variable of a feed-forward control. The controlled variable of the voltage regulator results directly from the comparison of the output voltage with a setpoint voltage. The controlled variable of the feed-forward control takes into account, inter alia, the input voltage of the DC-DC voltage converter, wherein the value of the input DC voltage may be corrected in such a way that the voltage regulator may be operated close to the zero point in steady-state operation. Thus, a more rapid and more precise regulation of the output voltage results.

The invention claimed is:

1. A DC-DC voltage converter (1) for converting an input DC voltage (U_in) into a predetermined output DC voltage (U_out), comprising:
    a comparator (10) configured to provide a controlled variable (R1) based on a comparison of the value of the output DC voltage (U_out) of the DC-DC voltage converter (1) with a predetermined setpoint voltage value (U_setpoint) for the output DC voltage (U_out);
    a corrector (11) configured to receive controlled variable (R1) from the comparator and adjust a value of the input DC voltage (U_in) of the DC-DC voltage converter (1) based on the controlled variable (R1) and a previously determined correction function, and to output the value (U_in,cor) of the adjusted input DC voltage, wherein the corrector (11) is configured to adjust the previously determined correction function in response to determining that the DC-DC voltage converter (1) is in a steady state;
    a regulator (12) configured to calculate an additional controlled variable (R2) using the value (U_in,cor) of the adjusted input DC voltage and the predetermined setpoint voltage value (U_setpoint) for the output DC voltage (U_out);
    a calculator (13) configured to calculate a regulator value (R3) from the controlled variable (R1) of the comparator (10) and the additional controlled variable (R2) of the regulator (12); and
    a DC-DC converter (20) configured to convert the input DC voltage (U_in) into the output DC voltage (U_out) using the regulator value (R3) calculated by the calculator (13).

2. The DC-DC voltage converter (1) as claimed in claim 1, wherein the corrector (11) is configured to calculate the previously determined correction function using the controlled variable (R1) and the value of the input DC voltage (U_in).

3. The DC-DC voltage converter (1) as claimed in claim 1, wherein the corrector (11) is configured to adjust the previously determined correction function when a predetermined enabling condition (A) has been met.

4. The DC-DC voltage converter (1) as claimed in claim 1, wherein the DC-DC converter (20) includes a transformer, and wherein the regulator (12) is configured to calculate the correction value using a transformation ratio of the transformer.

5. A method for regulating a DC-DC voltage converter (1), the method comprising:
    ascertaining (S1) a controlled variable (R1), based on a comparison of a value of an output DC voltage (U_out) of the DC-DC voltage converter (1) with a predetermined setpoint voltage value (U_setpoint) for the output DC voltage;
    adjusting (S2) a value (U_in,cor) of an input DC voltage of the DC-DC voltage converter (1) based on a previously determined correction function and the controlled variable (R1) in response to determining that the DC-DC voltage converter (1) is in a steady state;
    calculating (S3) an additional controlled variable (R2) using the value of the adjusted input DC voltage (U_in) and the predetermined setpoint voltage value (U_setpoint) for the output DC voltage (U_out);
    combining (S4) the controlled variable (R1) and the additional controlled variable (R2) to generate a regulator value (R3); and
    controlling (S5) the output DC voltage (U_out) of a DC-DC converter (20) of the DC-DC voltage converter (1) based on the regulator value (R3).

6. The method as claimed in claim 5, wherein the previously determined correction function is calculated using the controlled variable (R1) and the value of the input DC voltage (U_in).

7. The method as claimed in claim 5, wherein the previously determined correction function is calculated when a predetermined enabling condition (A) has been met.

8. The method as claimed in claim 7, wherein the predetermined enabling condition (A) includes at least one selected from the group consisting of a predetermined operating mode (M) of the DC-DC converter (20), an input current (I_in) into the DC-DC converter (20), an evaluation of an input voltage (U_in) of the DC-DC converter (20); an evaluation of the output DC voltage (U_out) of the DC-DC converter (20), and a result of a comparison of the controlled variable (R1) with a predetermined threshold value.

9. The method as claimed in claim 5, wherein the calculation of the additional controlled variable (R2) includes calculating the additional controlled variable (R2) using a value of the input current (I_in) of the DC-DC converter (1).

* * * * *